United States Patent
Luong et al.

(10) Patent No.: US 12,447,868 B2
(45) Date of Patent: Oct. 21, 2025

(54) METHOD FOR CONTROLLING A POWER ASSEMBLY

(71) Applicant: VOLVO TRUCK CORPORATION, Gothenburg (SE)

(72) Inventors: Staffan Luong, Borås (SE); Tove Audhav, Landvetter (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 28 days.

(21) Appl. No.: 18/334,798

(22) Filed: Jun. 14, 2023

(65) Prior Publication Data

US 2023/0398906 A1      Dec. 14, 2023

(30) Foreign Application Priority Data

Jun. 14, 2022    (EP) .................................... 22179034

(51) Int. Cl.
*B60L 50/75*        (2019.01)
*B60L 58/40*        (2019.01)
(Continued)

(52) U.S. Cl.
CPC ............... *B60L 58/40* (2019.02); *B60L 50/75* (2019.02); *H01M 8/04228* (2016.02);
(Continued)

(58) Field of Classification Search
CPC .......... B60L 50/75; B60L 58/12; B60L 58/40; B60L 2260/54; B60L 50/70; B60L 50/71;
(Continued)

(56) References Cited

U.S. PATENT DOCUMENTS

| 2015/0295293 A1* | 10/2015 | Kawashima | ...... H01M 8/04313 |
| | | | 429/9 |
| 2015/0314775 A1* | 11/2015 | Dextreit | ................ B60W 10/08 |
| | | | 180/65.265 |

(Continued)

FOREIGN PATENT DOCUMENTS

EP    3173284 A1    5/2017

OTHER PUBLICATIONS

Extended European Search Report in corresponding European Application No. 22179034.8 dated Nov. 28, 2022 (8 pages).

*Primary Examiner* — Elim Ortiz
(74) *Attorney, Agent, or Firm* — Venable LLP; Jeffri A. Kaminski

(57) ABSTRACT

A method for controlling a power assembly comprising a fuel cell unit and an electric energy storage system for storing excess electric energy produced by the fuel cell unit. The method comprises predicting a power demand from the power assembly over a prediction time horizon, obtaining a state-of-charge and/or power capability of the electric energy storage system, based on the predicted power demand and the obtained SoC and/or power capability, identifying a time period during which the power assembly is expected to be able to deliver power in accordance with the predicted power demand with the fuel cell unit shut down, or is at least expected to be able to deliver power at a minimum power level determined with respect to the predicted power demand, controlling the power assembly to shut down the fuel cell unit during at least a part of the identified time period in response to the identified time period being larger than a time threshold.

17 Claims, 5 Drawing Sheets

(51) Int. Cl.
*H01M 8/04228* (2016.01)
*H01M 8/04537* (2016.01)
*H01M 8/04992* (2016.01)
*H01M 16/00* (2006.01)
*H02J 7/34* (2006.01)

(52) U.S. Cl.
CPC ... *H01M 8/04626* (2013.01); *H01M 8/04992* (2013.01); *H01M 16/006* (2013.01); *H02J 7/34* (2013.01); *H01M 2250/20* (2013.01); *H01M 2250/402* (2013.01)

(58) Field of Classification Search
CPC .......... B60L 53/54; B60L 58/30; B60L 50/51; B60W 10/28; G05B 2219/2668; H01M 8/04298; H01M 16/003; H01M 2250/20; H01M 8/043; H01M 2250/402; H01M 8/04228; H01M 8/04626; H01M 8/04992; H01M 16/006; Y02E 60/50; Y02T 90/40; Y02T 10/70; Y02T 90/14; Y02T 10/7072; H02J 7/34
USPC .................. 307/10.1, 9.1; 701/22; 429/9
See application file for complete search history.

(56) References Cited

U.S. PATENT DOCUMENTS

| | | |
|---|---|---|
| 2016/0046204 A1 | 2/2016 | Oh |
| 2017/0144647 A1* | 5/2017 | Gutruf ................. B60W 20/00 |
| 2020/0185736 A1 | 6/2020 | Ito et al. |

* cited by examiner

METHOD FOR CONTROLLING A POWER ASSEMBLY

TECHNICAL FIELD

The invention relates to a method for controlling a power assembly comprising one or more fuel cell units and an electric energy storage system. It further relates to a power assembly, a control unit, a vehicle, a computer program, and a computer readable medium.

Although the invention will be described with respect to a truck, the invention is not restricted to this particular vehicle, but may also be used in other vehicles such as passenger cars and off-road vehicles. The invention may also be applied in vessels and in stationary applications, such as in grid-connected supplemental power generators or in grid-independent power generators.

BACKGROUND

Fuel cell systems can be used as an alternative or as a complement to electric batteries for powering of electric vehicles, but also in stationary applications such as in grid-connected and grid-independent power generators.

When a fuel cell system operates at low current densities, the polarisation cell voltage of the fuel cells increases, which in turn has a negative impact on the durability of the fuel cells. To save the fuel cells from degradation, an operational maximum polarisation cell voltage is set, meaning in practice that the lowest operational power of the fuel cells is limited. In certain situations, such as when a vehicle powered by the fuel cell system travels downhill, the fuel cell system may therefore be operated at a higher power than necessary in view of a power demand of the vehicle. Excess power generated by the fuel cell system may in that case be stored in a battery. However, when the battery has reached its maximum state-of-charge, SoC, power generated by the fuel cell system may instead be dissipated and thereby wasted.

In order to avoid energy dissipation, control strategies exist according to which the fuel cell system is turned off when the SoC of the battery is relatively high and the power demand is low. US20160046204 discloses such a method for controlling a fuel cell system of a vehicle, wherein the fuel cell is controlled to be on or off depending on a predicted power need of the vehicle and the SoC of a battery. However, turning the fuel cell on and off is associated with degradation of the fuel cell, reducing its service life.

SUMMARY

A primary object of the invention is to provide an in at least some aspect improved method for controlling a power assembly comprising a fuel cell unit and an electric energy storage system. In particular, it is an object to provide such a method which accounts for degradation of the fuel cell unit occurring in connection with start-up and shutdown of the fuel cell unit.

Thus, a method for controlling a power assembly is provided. The power assembly comprises a fuel cell unit and an electric energy storage system for storing excess electric energy produced by the fuel cell unit. The method, which may be performed by a control unit of the power assembly, comprises:

predicting a power demand for power delivery from the power assembly over a prediction time horizon, obtaining at least one of a state-of-charge, SoC, and a power capability of the electric energy storage system, based on the predicted power demand and the obtained SoC and/or power capability, identifying a time period within the prediction time horizon, during which time period the power assembly is expected to be able to deliver power in accordance with the predicted power demand with the fuel cell unit shut down, or is at least expected to be able to deliver power at a minimum power level determined with respect to the predicted power demand, controlling the power assembly to shut down the fuel cell unit during at least a part of the identified time period in response to the identified time period being larger than a time threshold.

Hence, according to the invention, the power assembly may be operated with the fuel cell turned off during certain time periods. By setting a time threshold and comparing the identified time period to the time threshold, it is possible to refrain from turning off the fuel cell unit during shorter time periods when such a mode of operation would not be desirable due to, for example, fuel cell degradation arising as a result of fuel cell shutdown and start-up. Instead, the fuel cell unit can be shut down only when the advantages of doing so, such as reduced fuel consumption and improved energy efficiency, outweigh the disadvantages, such as more rapid ageing of the fuel cell unit.

During the time period, the power assembly is expected to be able to deliver power in accordance with the power demand, or at least at the minimum power level. The minimum power level is herein set in relation to the predicted power demand. Typically, the power assembly may be able to deliver power in accordance with the power demand over a major portion of the time period, such as over 80% of the time period or more, such as over 90% of the time period, or preferably over the entire time period. Hence, a shorter time interval with a lower power may be accepted, as long as the lower power does not fall below the defined minimum power. The minimum power level may be set depending on performance requirements. For example, in a vehicle application, the minimum power level may be set such that the vehicle is able to travel at least at a predetermined vehicle speed.

By controlling the power assembly to shut down the fuel cell unit during at least a part of the identified time period, it is intended that the power assembly is operated with the fuel cell turned off during at least a part of the identified time period, such as during the entire identified time period, or during a portion of the identified time period starting at an identified suitable point in time for shutting down the fuel cell unit. Hence, during at least a part of the time period, the power assembly is operated either in a pure electric mode, i.e., using solely power from the electric energy storage system, or in a hybrid mode using solely power from the electric energy storage system and from another fuel cell of the power assembly. The power assembly may comprise more than one fuel cell units, in which case the fuel cell units may be controlled either independently or as a single system.

The time period may be understood as the time period during which the power assembly can be operated with the fuel cell unit turned off without violating any power limit as defined by the predicted power demand and/or the minimum power level, and without violating any SoC limit of the electric energy storage system, hereinafter also referred to as the ESS. The SoC is a measure of the amount of energy available in the ESS at a specific point in time, usually expressed as a percentage of the amount of energy in the fully charged electric energy storage system.

The term "power capability" as used herein refers to a charge and discharge capability of the ESS. For example, the term "power capability", as used herein, typically refers to a charge and discharge capability of a battery within the ESS. The capability to charge and discharge the battery generally refers to a condition of the battery under ordinary use of the battery, such as in a vehicle. For example, state-of-power, SoP, is one example of an operational parameter indicative of the power capability of the ESS. The SoP of the ESS is defined by the maximum constant current magnitude or power magnitude with which the ESS can be continuously charged or discharged during the following time horizon of concern, i.e., the prediction time horizon, without violating any battery cell-level operating constraints. The SoP of the ESS may be determined in terms of one or both of current magnitude and power magnitude.

When the fuel cell unit has been turned off, the SoC of the ESS will decrease over time as energy from the ESS is consumed. The evolution of the SoC value over time is a function of the initial SoC and the power demand. Thus, the SoC value as a function of time over the prediction horizon may be calculated from the predicted power demand and the initial SoC of the ESS, which may, purely by way of example, be estimated from measured open circuit voltage (OCV) of the ESS and/or determined using Coulomb counting. Obtaining the SoC of the ESS may thus comprise calculating the SoC as a function of time based on the initially obtained SoC and the predicted power demand. The initial SoC value may be received from a control system of the ESS, such as a battery management unit or similar, or calculated based on measurement data received from the ESS.

The power or current that the ESS can actually deliver is dependent on the SoC of the ESS. The power capability increases with increasing SoC, such that a fully charged ESS can deliver a higher output power than an ESS with a relatively low SoC. Hence, when the maximum output power of the ESS as a function of SoC is known, the obtained SoC may be used to determine a maximum output power that may in turn be compared to the predicted power demand to determine whether the power assembly is expected to be able to deliver power in accordance with the predicted power demand with the fuel cell unit shut down.

When the identified time period is shorter than the time threshold, the fuel cell unit remains turned on.

Optionally, the identified time period is a time period during which the power assembly is expected to be able to deliver power in accordance with the predicted power demand or at the minimum power level without violating a minimum SoC limit of the electric energy storage system. The minimum SoC limit may be a predetermined limit. The minimum SoC limit may vary with age of the ESS such that at the beginning of life of an ESS, the minimum SoC limit is set to a lower value than when the ESS becomes aged.

Optionally, identifying the time period comprises comparing the predicted power demand to at least one power demand threshold.

Optionally, identifying the time period further comprises comparing the obtained SoC to at least one SoC threshold and/or comparing the power capability to at least one power capability threshold. Hence, identifying the time period may comprise determining a maximum possible output power, or current, from the ESS and comparing the maximum possible output power, or current, to at least one power threshold.

Optionally, identifying the time period comprises identifying a first point in time at which a predetermined first criterion is fulfilled, and a second point in time at which a predetermined second criterion is fulfilled, wherein the first and second points in time are respective end points of the time period. The first criterion is herein a criterion for possible shutdown of the fuel cell unit, and the second criterion is a criterion for start-up of the fuel cell unit. The second point in time is subsequent to the first point in time.

Optionally, the predetermined first criterion is considered fulfilled when the predicted power demand is below a first power demand threshold, and optionally when the SoC is above a first SoC threshold and/or when a power capability of the electric energy storage system is above a first power capability threshold. Hence, when the predicted power demand is below the first power demand threshold, and optionally when the SoC/power capability is above the first SoC/power capability threshold, a possible first point of the time period is identified. The SoC may herein be the SoC at the possible first point, i.e., a calculated SoC value is used, based on initial SoC and predicted power demand. The first SoC threshold may be set to be dependent on the first power demand threshold. Instead of comparing the SoC to a first SoC threshold, the SoC may be used to determine the power capability of the ESS, which power capability is in turn compared to a first power capability threshold. The power capability may alternatively be obtained in other ways, without using SoC.

Optionally, the predetermined second criterion is considered fulfilled when the predicted power demand is above a second power demand threshold, and optionally when the SoC is below a second SoC threshold and/or when the power capability is below a second power capability threshold. Hence, when the predicted power demand is above the second power demand threshold, and optionally when the SoC/power capability is below the second SoC/power capability threshold, a second point of the time period is identified, at which it will be necessary to start the fuel cell unit again in order not to violate SoC and/or power limits of the power assembly. The SoC may be the calculated SoC at the second point of the time period. The second SoC threshold may be set to be dependent on the second power demand threshold. Instead of comparing the SoC to a second SoC threshold, the SoC may be used to determine a power capability of the ESS, which power capability is in turn compared to a second power capability threshold. The power capability may alternatively be obtained in other ways, without using SoC.

The predetermined second criterion may also be considered fulfilled when, during the entire prediction time horizon remaining after the first point in time, the predicted power demand stays below the second power demand threshold, and optionally when the SoC stays below the second SoC threshold and/or when the power capability stays below the second power capability threshold. In this case, the second point in time is unknown and the identified time period may be determined to be larger than the time threshold.

Optionally, predicting the power demand comprises predicting an instantaneous power demand as a function of time over the prediction time horizon, wherein identifying the time period comprises comparing the predicted instantaneous power demand to at least one power demand threshold. The predicted instantaneous power demand should in this case be lower than a power demand threshold in order to identify a possible first point of the time period. Once the predicted instantaneous power demand is above the power demand threshold, a second point of the time period is identified. Of course, the SoC of the ESS may also be taken into account to determine whether the first and second points of the time period are reached.

Optionally, predicting the power demand comprises determining an average power demand over at least a sub-range of the prediction time horizon, wherein identifying the time period comprises comparing the determined average power demand to at least one power demand threshold. The average power demand may be used in addition to the instantaneous power demand or as an alternative thereto. The power demand threshold that the average power demand is compared to may be different from, typically lower than, the power demand threshold that the instantaneous power demand is compared to. Of course, the SoC and/or power capability of the ESS may also be taken into account to determine whether the first and second points of the time period are reached.

Optionally, the time threshold is a predetermined fixed value. The predetermined fixed value may be set taking fuel cell degradation resulting from shutdown and start-up of the at least one fuel cell unit, efficiency loss of the power assembly during the time period and expected fuel saving during the time period into account. Also, ESS degradation occurring as a result of, e.g., charging the ESS above a maximum SoC limit may be taken into account.

Optionally, the method further comprises determining the time threshold based on at least one of an expected fuel cell degradation resulting from shutdown and start-up of the fuel cell unit, an expected efficiency loss of the power assembly during the time period, and an expected fuel saving during the time period. Additionally, the time threshold can be set based on an expected ESS degradation occurring as a result of, e.g., charging the ESS above a maximum SoC limit, high ESS temperatures, or high current throughputs. Hence, the time threshold can be varied over the lifetime of the power assembly.

Optionally, the power assembly comprises two or more fuel cell units, and identifying the time period comprises identifying a time period during which the power assembly is expected to be able to deliver power in accordance with the power demand with at least one of the at least two fuel cell units shut down, and wherein, in response to the identified time period being larger than the time threshold, said at least one fuel cell unit is scheduled to be shut down during at least a part of the identified time period. Hence, some or all of the fuel cell units may be shut down during the identified time period. The fuel cell unit(s) may not need to be turned on again after the identified time period. Furthermore, if something unexpected happens, the fuel cell unit(s) may be turned on again during the identified time period.

Optionally, the time threshold is set to a value which is specific for each one of the two or more fuel cell units. This may be relevant when the two or more fuel cell systems are of different types, configurations, sizes, and/or ages, since the degradation of the fuel cell units arising at start-up and shutdown as well as during operation differs depending on those factors. The threshold time is set to a value above which the cost for shutting down the fuel cell becomes lower than the cost for keeping it turned on.

Optionally, the power assembly is adapted to deliver power contributing to the propulsion of a vehicle, and wherein predicting the power demand comprises:
receiving vehicle related information comprising at least one of traffic information for an expected travelling route of the vehicle during the prediction time horizon, terrain information for the expected travelling route, topographic information for the expected travelling route during the prediction time horizon, weather information for the expected travelling route during the prediction time horizon, and vehicle gross weight information, and
using said received vehicle related information for predicting the power demand over the prediction time horizon.

One or more of the above vehicle related pieces of information can contribute to a proper prediction of the power demand.

According to a second aspect of the invention, a control unit configured to perform the method according to the first aspect is provided. The control unit may be an electronic control unit.

Advantages and effects of the second aspect of the invention are largely analogous to the advantages and effects of the first aspect of the invention.

According to a third aspect of the invention, a power assembly comprises one or more fuel cell units and an electric energy storage system for storing excess electric energy produced by the one or more fuel cell units. The power assembly further comprises the control unit according to the second aspect.

According to a fourth aspect of the invention, a vehicle comprises a power assembly according to the third aspect, wherein the power assembly is adapted to deliver power contributing to the propulsion of the vehicle. The power assembly may be configured to deliver power in accordance with a power request received from a control unit of the vehicle.

According to a fifth aspect of the invention, a computer program comprising program code means for performing the method of the first aspect when the program is run on a computer is provided.

According to a sixth aspect of the invention, a computer readable medium carrying a computer program comprising program code means for performing the method of the first aspect when the program is run on a computer is provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

With reference to the appended drawings, below follows a more detailed description of embodiments of the invention cited as examples.

Figure 1:
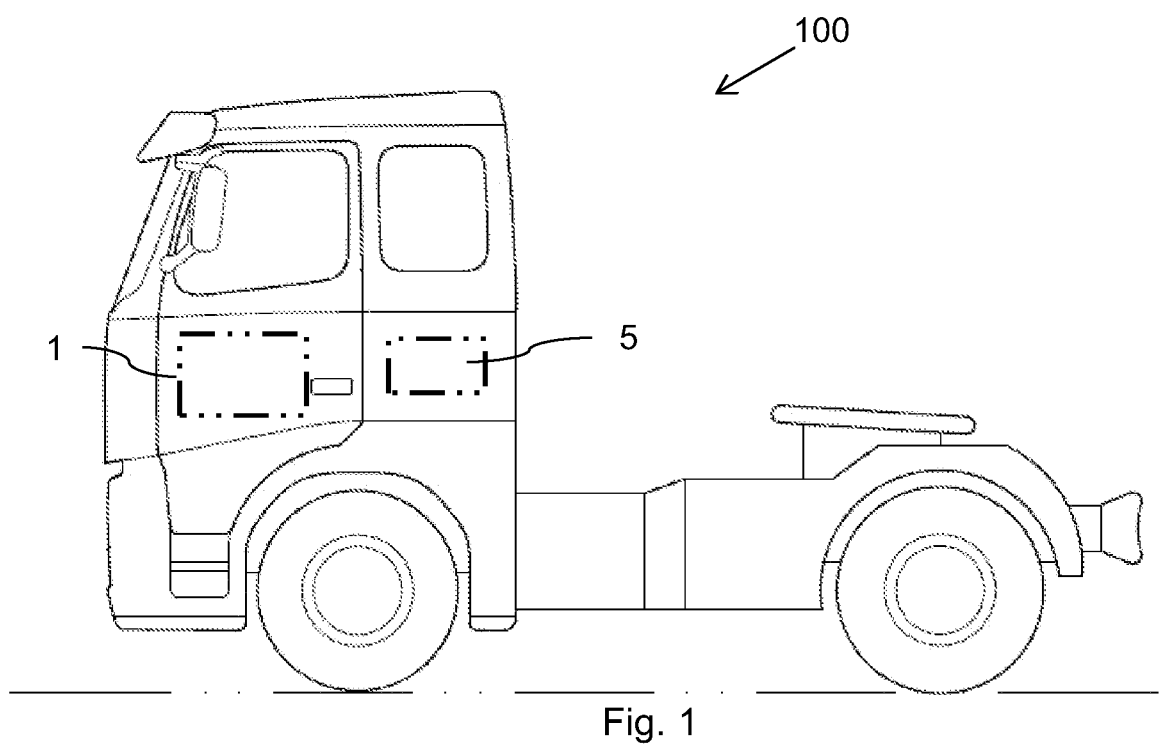
FIG. 1 is a schematic side view of a vehicle.

FIG. 1 depicts a side view of a vehicle 100 according to an example embodiment of the invention. The vehicle 100 is here a truck, more specifically a heavy-duty truck for towing one or more trailers (not shown). Even though a heavy-duty truck 100 is shown it shall be noted that the invention is not limited to this type of vehicle but may be used for any other type of vehicle, such as a bus, construction equipment, e.g., a wheel loader and an excavator, and a passenger car. The invention is also applicable for other applications not relating to vehicles as long as a power assembly comprising a fuel cell unit and an electric energy storage system, ESS, are utilized.

The vehicle 100 comprises a power assembly 1 according to an example embodiment of the invention. The power assembly 1 is here used for powering one or more electric motors (not shown) which are used for creating a propulsion force to the vehicle 100. The power assembly 1 may additionally or alternatively be used for powering other electric power consumers of the vehicle, such as an electric motor for a refrigerator system, an electric motor for an air conditioning system or any other electric power consuming function of the vehicle 100.

The vehicle 100 further comprises a control unit 5 according to an example embodiment of the invention. The control unit 5 is thus used for controlling the power assembly 1. Even though an on-board control unit 5 is shown, it shall be understood that the control unit 5 could also be a remote control unit 5, i.e., an off-board control unit, or a combination of an on-board and off-board control unit. The control unit 5 may be configured to control the power assembly 1 by issuing control signals and by receiving status information relating to the power assembly 1. The control unit 5 may form part of the power assembly 1.

The control unit 5 is an electronic control unit and may comprise processing circuitry which is adapted to run a computer program as disclosed herein. The control unit 5 may comprise hardware and/or software for performing the method according to the invention. In an embodiment the control unit 5 may be denoted a computer. The control unit 5 may be constituted by one or more separate sub-control units. In addition, the control unit 5 may communicate by use of wired and/or wireless communication means.

Figure 2:
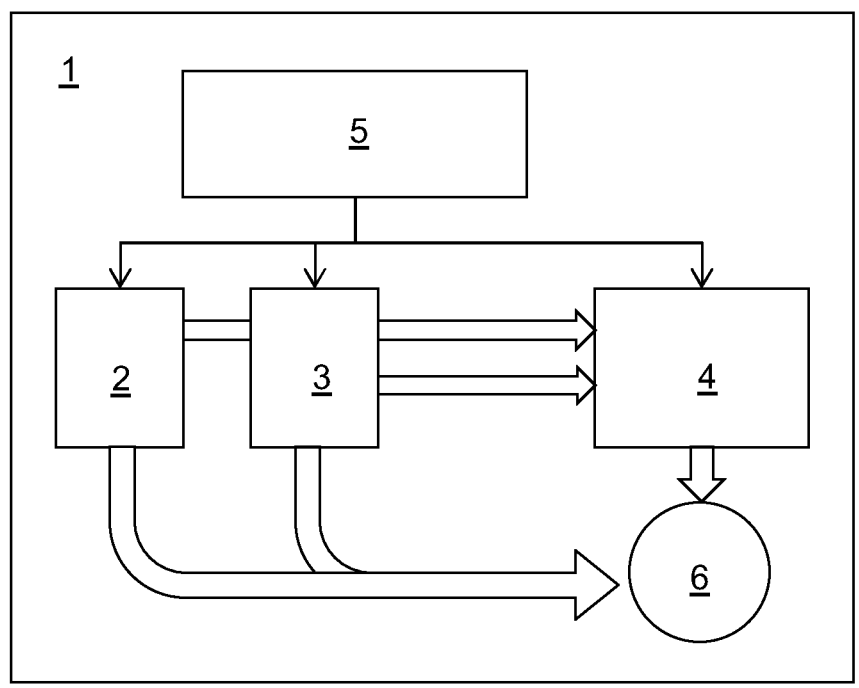
FIG. 2 is a schematic view of a power assembly according to an example embodiment of the invention.

FIG. 2 depicts a schematic illustration of a power assembly 1 according to an example embodiment of the invention. The power assembly 1 may for example be used in the vehicle 100 as shown in FIG. 1.

The power assembly 1 comprises at least one fuel cell unit, herein a first fuel cell unit 2 and a second fuel cell unit 3. Each fuel cell unit 2, 3, although not illustrated in detail, may comprise one or more fuel cells, typically several fuel cells. The fuel cells may also be denoted as a fuel cell stack, wherein the fuel cell stack may comprise several hundreds of fuel cells. Further, each fuel cell unit is arranged to provide the fuel cells with necessary supply of hydrogen fuel and air, cooling, etc. Each fuel cell unit 2, 3 may comprise its own control system, which may be communicatively connected to the control unit 5. Although the power assembly 1 in the illustrated embodiment comprises two fuel cell units 2, 3, it may alternatively comprise a single fuel cell unit, or more than two fuel cell units, such as three or more fuel cell units. Furthermore, when several fuel cell units are provided, the fuel cell units may be either independently controllable or commonly controllable. When independently controllable, each fuel cell unit may be controlled to an on-state or an off-state regardless of the state(s) of the other fuel cell unit(s). When two or more of the fuel cell units are commonly controllable, those fuel cell units are controllable in common to an on-state or an off-state, i.e., all fuel cell units are controlled in common to the same state. Two fuel cell units may in some cases be controlled in dependence on one another, such that one of the fuel cell units is controlled to an on-state or an off-state in dependence on the state of the other fuel cell units.

The power assembly 1 further comprise an ESS 4, which may in turn comprise one or more batteries for storing excess electric energy produced by the fuel cell units 2, 3, as well as for providing output power from the power assembly 1. The ESS 4 is electrically connected to the fuel cell units 2, 3. The ESS 4 may comprise its own control system, communicatively connected to the control unit 5. The ESS 4 may further be used for storing energy regenerated during braking, and/or it may be configured for charging by a charger, such as from an external power grid.

The power assembly 1 may further comprise power electronics (not shown) for converting electric power generated by the fuel cell units 2, 3 and/or provided from the ESS 4 to electric power usable by a power consumer 6, such as an electric motor or another power consumer. Further, in addition or alternative to what is mentioned in the above, the power assembly 1 may comprise various components such as compressors, sensors, pumps, valves, and electrical components.

Figure 3:
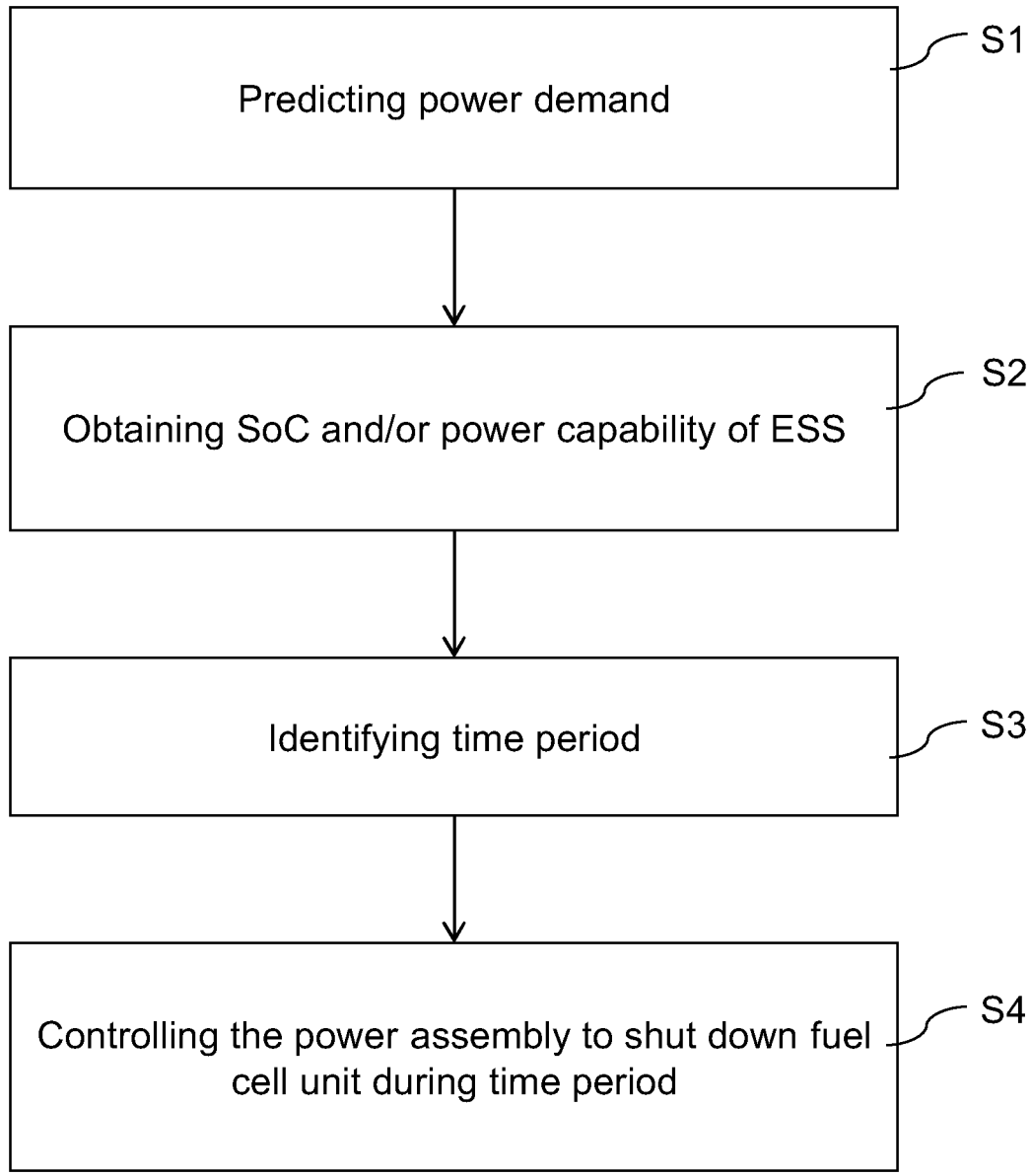
FIG. 3 is a flow chart illustrating an embodiment of the method of the present invention.
Figure 4A:
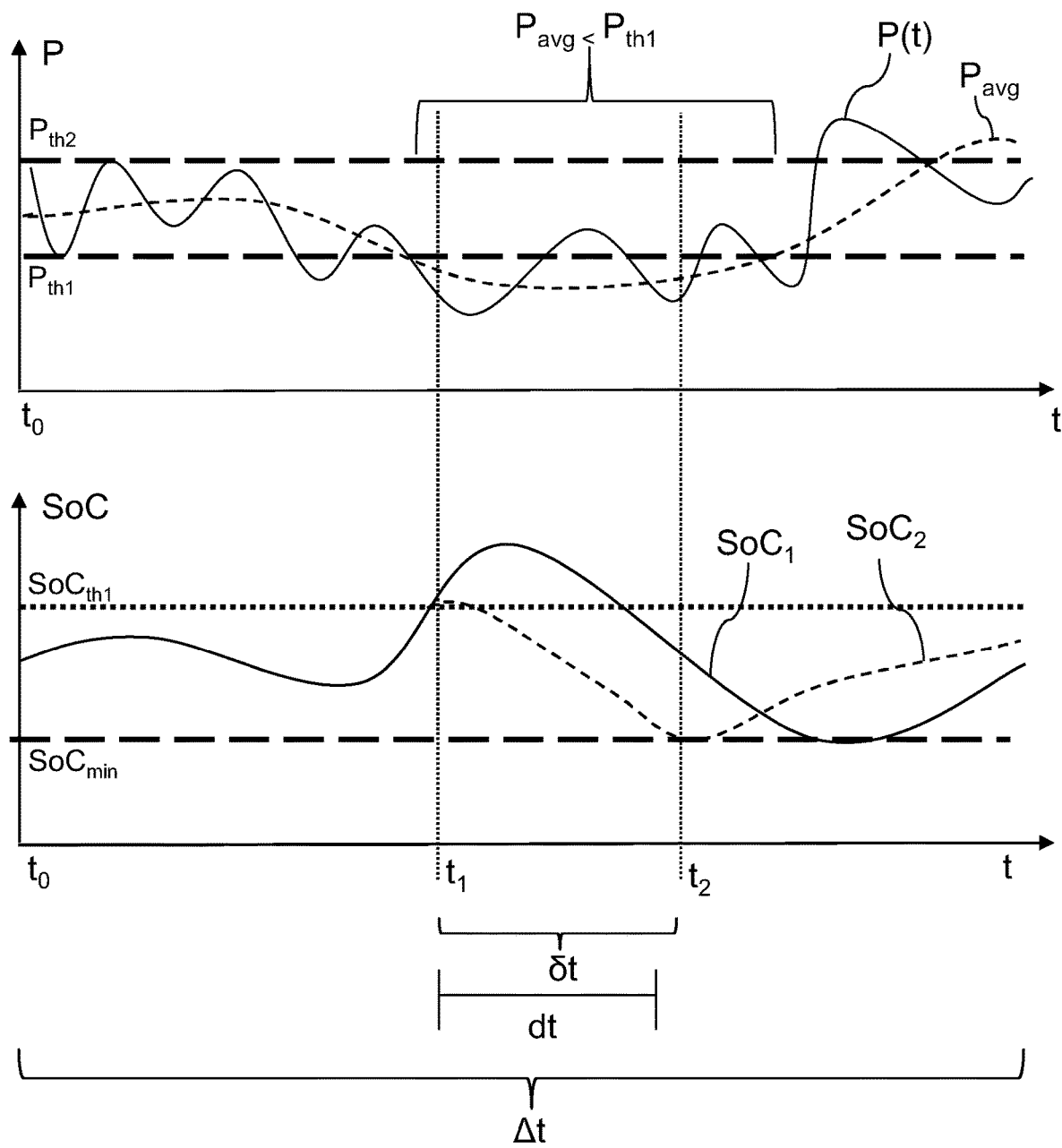
FIG. 4a-b illustrates predicted power demand as a function of time over a prediction horizon.
Figure 4B:
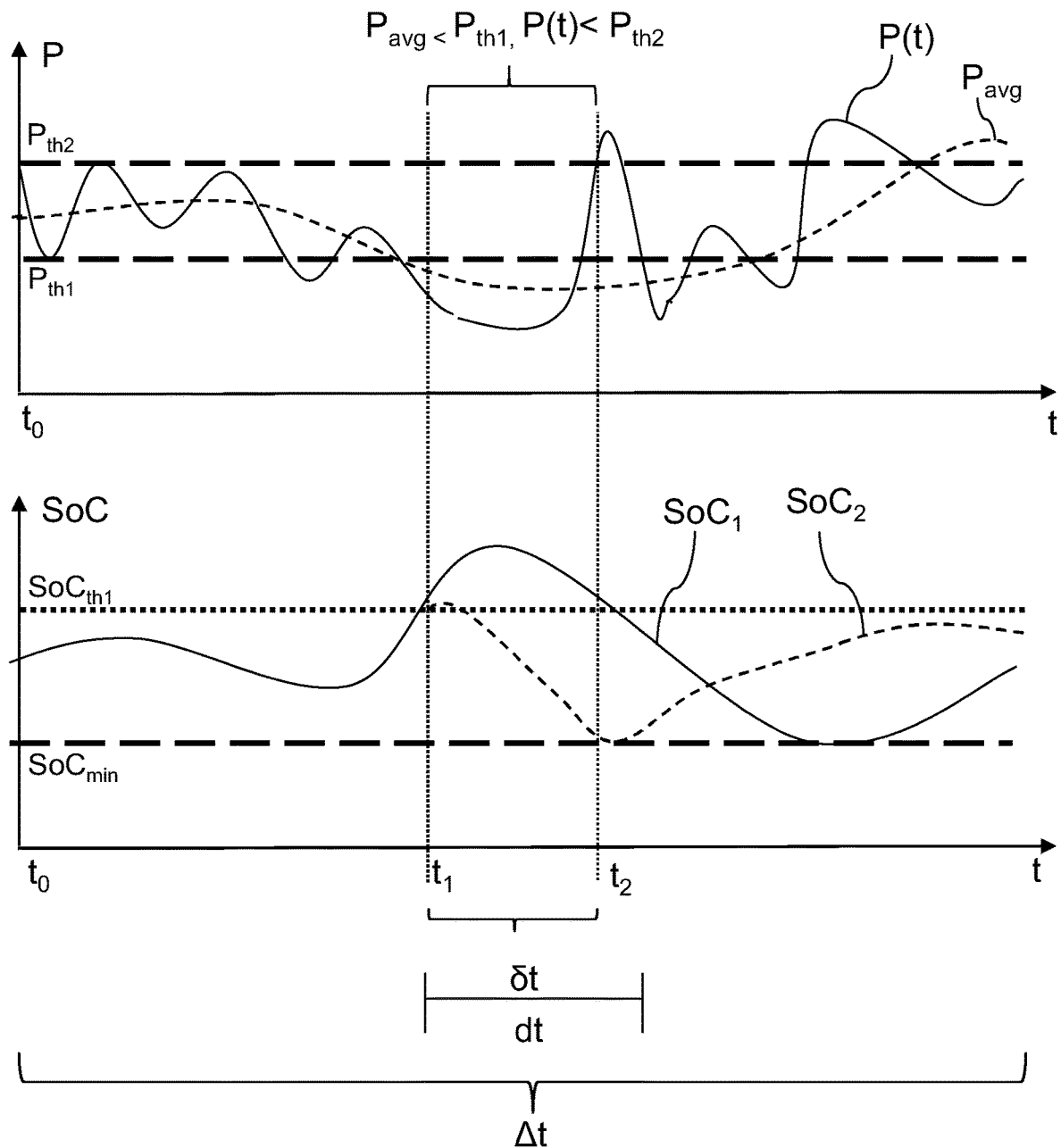

FIG. 3 depicts a method for controlling a power assembly, such as the power assembly 1 illustrated in FIG. 2, according to an embodiment of the invention. Reference is also made to FIGS. 4a-4b, illustrating two different exemplary operation scenarios.

In a first step S1, a power demand P for power delivery from the power assembly 1 over a prediction time horizon $\Delta t$ is predicted. When the power assembly 1 is adapted to deliver power contributing to the propulsion of a vehicle 100, the step S1 of predicting the power demand P may comprise:

receiving vehicle related information comprising at least one of traffic information for an expected travelling route of the vehicle 100 during the prediction horizon $\Delta t$, terrain information for the expected travelling route, topographic information for the expected travelling route during the prediction horizon $\Delta t$, weather information for the expected travelling route during the prediction horizon $\Delta t$, and vehicle gross weight information, and using said received vehicle related information for predicting the power demand P over the prediction horizon $\Delta t$.

The first step S1 of predicting the power demand P may comprises predicting an instantaneous power demand P(t) as a function of time t over the prediction time horizon $\Delta t$. It may alternatively, or additionally, comprise determining an average power demand $P_{avg}$ over at least a sub-range of the prediction time horizon $\Delta t$.

In a second step S2, a state-of-charge, SoC, and/or a power capability, of the electric energy storage system 4 is obtained. An initial SoC value or power capability value, such as a SoC or power capability of the ESS 4 at a time of predicting the power demand P, may be received from the control system of the ESS 4, or it may be determined within the control unit 5 based on measurement data from the ESS 4. The SoC and/or power capability of the ESS 4 as a function of time t over the prediction time horizon $\Delta t$ may be calculated in the control unit 5 as a function of the predicted power demand and a state of the fuel cell unit 2, 3.

In a third step S3, based on the predicted power demand P and the obtained SoC and/or power capability, a time period $\delta t$ within the prediction time horizon $\Delta t$ is predicted, during which time period δf the power assembly 1 is expected to be able to deliver power in accordance with the predicted power demand P with the fuel cell unit 2, 3 shut down, or is at least expected to be able to deliver power at a minimum power level determined with respect to the predicted power demand P. The identified time period δt may, e.g., be a time period during which the power assembly 1 is expected to be able to deliver power in accordance with the predicted power demand P or at the minimum power level without violating a minimum SoC limit $SoC_{min}$ of the ESS 4.

The third step S3 of identifying the time period δt may comprise identifying a first point in time $t_1$, at which a predetermined first criterion is fulfilled, and a subsequent second point in time $t_2$, at which a predetermined second criterion is fulfilled. The first and second points in time $t_1$, $t_2$ are respective end points of the time period δt, wherein the first point in time $t_1$ defines a possible point in time at which a shutdown of the fuel cell unit 2, 3 may be initiated, and wherein the second point in time $t_2$ may define a point in time at which a start-up of the fuel cell unit 2, 3 must be, or is desirable to be, initiated. The predetermined first criterion may be set so that it is considered fulfilled at a point in time when the predicted power demand P is below a first power demand threshold, and optionally when the SoC is above a first SoC threshold $SoC_{th1}$, or when a power capability of the ESS 4 is above a first power capability threshold.

The predetermined second criterion may be set so that it is considered fulfilled when start-up of the fuel cell unit 2, 3 needs to be initiated again. This may be fulfilled when the predicted power demand P is above a second power demand threshold, and optionally when the SoC is below a second SoC threshold, such as minimum SoC limit $SoC_{min}$ of the ESS 4, or when the power capability of the ESS 4 is below a second power capability threshold.

When the instantaneous power demand has been predicted in the first step S1, the time period may be identified by comparing the predicted instantaneous power demand to at least one instantaneous power demand threshold. When the average power demand has been determined in the first step S1, the time period may be identified by comparing the predicted instantaneous power demand to at least one average power demand threshold. A combination of instantaneous and average power demand thresholds may be applied.

In a fourth step S4, the power assembly 1 is controlled to shut down the fuel cell unit 2, 3 during at least a part of the identified time period δt in response to the identified time period δt being larger than a time threshold dt. Thus, the identified time period Otis compared to the time threshold dt. The time threshold dt may be a predetermined fixed value, or it may be determined based on at least one of an expected fuel cell degradation resulting from shutdown and start-up of the fuel cell units 2, 3, an expected efficiency loss of the power assembly 1 during the time period δt, and an expected fuel saving during the time period δt. For example, if the expected fuel saving arising due to fuel cell unit shutdown is relatively large, a relatively short time threshold dt may be set, while as if the expected fuel saving is small, a larger time threshold may be set. The time threshold can further be determined based on an expected ESS degradation. The step S4 may comprise initiating shutdown of the fuel cell unit 2, 3 at the first point in time $t_1$ identified as a starting point of the time period δt. The power assembly 1 may thereafter be controlled to either operate with the fuel cell unit 2, 3 shut down during the entire identified time period δt or longer, or to turn on the fuel cell unit 2, 3 again depending on an outcome of an updated prediction at a later point in time.

In some cases, the predicted power demand P may be below the second power demand threshold, and the SoC and/or the power capability may be expected to stay above the respective second thresholds during the entire prediction time horizon Δt remaining after the first point in time $t_1$. In such cases, a point in time at which it will be necessary to start up the fuel cell units 2, 3 again falls after the prediction horizon Δt. Hence, it may be determined that the identified time period Otis larger than the time threshold dt, without actually having identified the second point in time.

When the power assembly 1 comprises two or more fuel cell units 2, 3, the third step S3 of identifying the time period may comprise identifying a time period δt during which the power assembly 1 is expected to be able to deliver power in accordance with the power demand P with at least one of the at least two fuel cell units 2, 3 shut down, i.e., turned off. In response to the identified time period δt being larger than the time threshold dt, the at least one of the two or more fuel cell units 2, 3 is shut down during the identified time period EC Hence, the power assembly 1 may during the time period δt be operated with one fuel cell unit 2, 3 turned off and one turned on. The time threshold dt may herein be set to a value which is specific for each one of the two or more fuel cell units 2, 3. For example, if the fuel cell units 2, 3 are different in behaviour and in size, the degradation arising at shutdown and start-up will differ. The time threshold dt may be set by taking such differences into account.

FIG. 4a schematically illustrates a first exemplary operation scenario of the power assembly 1. The upper diagram of FIG. 4a illustrates power demand P as a function of time t for a power assembly 1, and the lower diagram illustrates expected SoC of the ESS 4 of the power assembly 1 as a function of time t. At a time $t_0$, the instantaneous power demand P(t) of the power assembly 1, illustrated by a solid line, is initially predicted over the prediction time horizon Δt. An average power demand $P_{avg}$ over the prediction time horizon Δt is also determined, as illustrated by a dashed line.

In the first exemplary operation scenario, a first point in time $t_1$ is identified at which the average predicted power demand $P_{avg}$ and the instantaneous predicted power demand P(t) are below a first power demand threshold $P_{th1}$ and a second power demand threshold $P_{th2}$, respectively, and at which the SoC is above a first SoC threshold level $SoC_{th1}$. A predetermined first criterion is thereby considered fulfilled and the first point in time $t_1$ is identified as a possible time for shutting down the fuel cell units 2, 3, and consequently as a starting point for a time period δt during which it may be possible to operate the power assembly 1 with the fuel cell units 2, 3 turned off. The expected SoC development after a possible shutdown of the fuel cell units 2, 3 at the first point in time $t_1$ is illustrated as a dashed line $SoC_2$, while the solid line $SoC_1$ illustrates the SoC development under the assumption that the fuel cell units 2, 3 remain turned on.

As can be seen in the upper diagram, it the fuel cell units 2, 3 are turned off at the first point in time $t_1$, the SoC value is expected to fall to a SoC threshold level corresponding to a minimum SoC limit $SoC_{min}$, at a second point in time $t_2$, necessitating a start-up of the fuel cell units 2, 3. Hence, at the second point in time $t_2$, a second predetermined criterion is considered fulfilled even though the predicted average power $P_{avg}$ and instantaneous power P(t) remain below the first and second power demand thresholds $P_{th1}$, $P_{th2}$, respectively, at and after the second point in time $t_2$. The second point in time $t_2$ is thereby identified as an end point of the time period δt.

The time period δt is compared to a time threshold dt and since it is found that the time period δt is larger than the time threshold dt, the power assembly 1 may be controlled to shut down the fuel cell units 2, 3 at the first point in time $t_1$. Start-up of the fuel cell units 2, 3 may be planned at the second point in time $t_2$, but the start-up may be postponed or advanced depending on the, for example, unexpected events not accounted for in the initial prediction. The prediction is preferably updated continuously to identify such unexpected changes.

FIG. 4b schematically illustrates a second exemplary operation scenario of the power assembly 1. The same annotations are used as in the first exemplary operation scenario illustrated in FIG. 4a, and the first point in time $t_1$ is identified as described above with reference to FIG. 4a. However, in the second operation scenario, the predicted instantaneous power demand P(t) increases above the second power demand threshold $P_{th2}$ at the second point in time $t_2$, just before a point in time at which the SoC value, illustrated by the dashed line $SoC_2$, is expected to fall below the minimum SoC limit $SoC_{min}$. Hence, the second point in time $t_2$ is identified as an end point of the time period δt, at which start-up of the fuel cell units 2, 3 is desired. The time period δt between the first and second points in time $t_1$, $t_2$ is compared to the time threshold dt. Since it is found that the time period δt is smaller than the time threshold dt, the power assembly 1 will in this case be controlled to keep the fuel cell units 2, 3 operational, i.e., turned on.

Figure 5A:
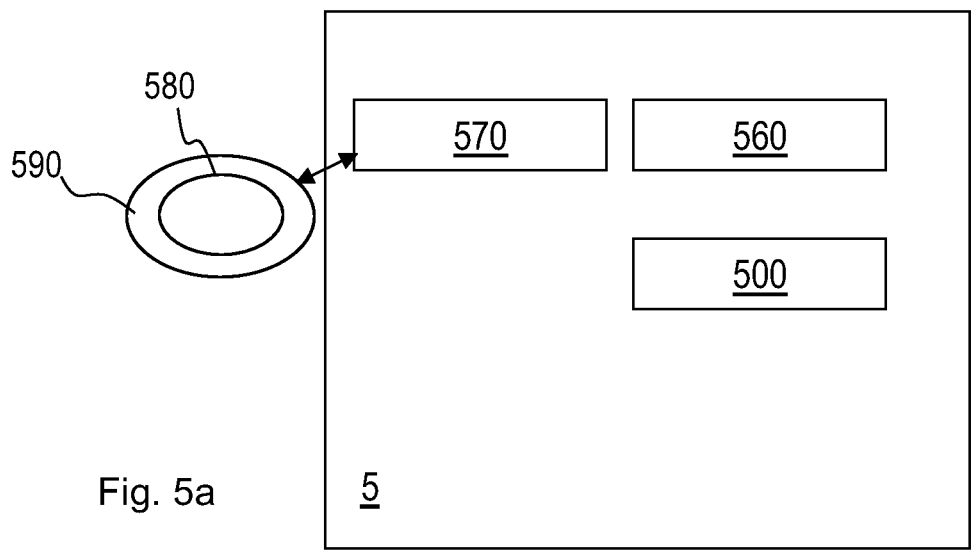
FIG. 5a-b are schematic block diagrams illustrating a control unit according to embodiments herein.
Figure 5B:
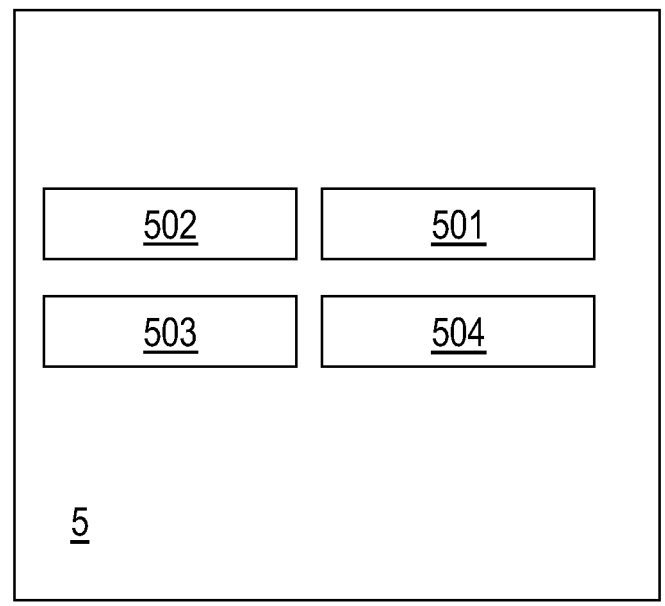

To perform the method steps described herein, the control unit 5 may be configured to perform any one or more of the above steps S1-S4, and/or any other examples or embodiments herein. The control unit 5 may for example comprise an arrangement as depicted in FIGS. 5a and 5b.

The control unit 5 may comprise an input and output interface 500 configured to communicate with any necessary components and/or entities of embodiments herein, e.g., to receive system states from the ESS 4, to receive traffic information, terrain information, topographic information, weather information, and vehicle gross weight information. The input and output interface 500 may comprise a wireless and/or wired receiver (not shown) and a wireless and/or wired transmitter (not shown). The control unit 5 may be arranged in any suitable location of the vehicle 100. The control unit 5 may use the input and output interface 500 to control and communicate with sensors, actuators, subsystems, and interfaces in the vehicle 100 by using any one or more out of a Controller Area Network (CAN), ethernet cables, Wi-Fi, Bluetooth, and other network interfaces.

The control unit 5 is arranged to, by means of a predicting unit 501, predict the power demand for power delivery from the power assembly 1 over the prediction time horizon based on data received via the interface 500.

The control unit 5 may further be arranged to, by means of an obtaining unit 502, obtain at least one of a state-of-charge, SoC, and a power capability of the electric energy storage system 4.

The control unit 5 is further arranged to, by means of an identifying unit 503, identify a time period δt within the prediction time horizon Δt during which the power assembly 1 is expected to be able to deliver power in accordance with the predicted power demand with the fuel cell unit 2, 3 shut down, or is at least expected to be able to deliver power at a minimum power level determined with respect to the predicted power demand. The identifying unit 503 is configured to identify the time period δt based on the predicted power demand and the obtained SoC and/or power capability.

The control unit 5 is further arranged to, by means of a controlling unit 504, control the power assembly 1 to shut down the fuel cell unit 2, 3 during the identified time period δt in response to the identified time period δt being larger than a time threshold dt.

The method described herein may be implemented through a processor or one or more processors, such as the processor 560 of a processing circuitry in the control unit 5 depicted in FIG. 5a, together with computer program code for performing the functions and actions of the embodiments herein. The program code mentioned above may also be provided as a computer program medium, for instance in the form of a data computer readable medium carrying computer program code for performing the method steps described herein when being loaded into the control unit 5. One such computer readable medium may be in the form of a memory stick. The computer program code may furthermore be provided as pure program code on a server and downloaded to the control unit 5.

The control unit 5 may further comprise a memory 570 comprising one or more memory units. The memory 570 comprises instructions executable by the processor in control unit 5. The memory 570 is arranged to be used to store, e.g., information, data, control scenarios, costs, etc. to perform the methods herein when being executed in the control unit 5.

In some embodiments, a computer program 580 comprises instructions, which when executed by a computer, e.g., the at least one processor 560, cause the at least one processor of the control unit 5 to perform the method steps described above.

In some embodiments, a computer-readable storage medium 590 comprises the respective computer program 580. The computer-readable storage medium 590 may comprise program code for performing the method steps described above when said program product is run on a computer, e.g., the at least one processor 560.

Those skilled in the art will appreciate that the units in the control unit 5 described above may refer to a combination of analogue and digital circuits, and/or one or more processors configured with software and/or firmware, e.g., stored in the control unit 5, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip.

It is to be understood that the present invention is not limited to the embodiments described above and illustrated in the drawings; rather, the skilled person will recognize that many changes and modifications may be made within the scope of the appended claims.

The invention claimed is:

1. A method for controlling a power assembly via a control unit, the power assembly comprising a fuel cell unit and an electric energy storage system for storing excess electric energy produced by the fuel cell unit, the method comprising:
   predicting, by a processing circuitry of the control unit, a power demand for power delivery from the power assembly over a prediction time horizon, obtaining, by the processing circuitry, at least one of a SoC (state-of-charge) or a power capability of the electric energy storage system, based on the predicted power demand and the obtained SoC or power capability, identifying, by the processing circuitry, a time period within the prediction time horizon, during which time period the power assembly is expected to be able to deliver power in accordance with the predicted power demand with the fuel cell unit shut down, or is at least expected to be able to deliver power at a minimum power level determined with respect to the predicted power demand, comparing, by the processing circuitry, the identified time period to a time threshold, controlling, by the processing circuitry, the power assembly to shut down the fuel cell unit during at least a part of the identified time period in response to the identified time period being larger than the time threshold.

2. The method according to claim 1, wherein the identified time period is a time period during which the power assembly is expected to be able to deliver power in accordance with the predicted power demand or at the minimum power level without violating a minimum SoC limit of the electric energy storage system.

3. The method according to claim 1, wherein identifying the time period comprises:

comparing the predicted power demand to at least one power demand threshold, and optionally comparing the obtained SoC to at least one SoC threshold, or comparing the power capability to at least one power capability threshold.

4. The method according to claim 1, wherein identifying the time period comprises identifying a first point in time at which a predetermined first criterion is fulfilled, and a second point in time at which a predetermined second criterion is fulfilled, wherein the first and second points in time are respective end points of the time period.

5. The method according to claim 4, wherein the predetermined first criterion is considered fulfilled when the predicted power demand is below a first power demand threshold, and optionally when the SoC is above a first SoC threshold or when the power capability is above a first power capability threshold.

6. The method according to claim 4, wherein the predetermined second criterion is considered fulfilled when the predicted power demand is above a second power demand threshold, and optionally when the SoC is below a second SoC threshold or when the power capability is below a second power capability threshold.

7. The method according to claim 1, wherein predicting the power demand comprises predicting an instantaneous power demand as a function of time over the prediction time horizon, and wherein identifying the time period comprises comparing the predicted instantaneous power demand to at least one power demand threshold.

8. The method according to claim 1, wherein predicting the power demand comprises determining an average power demand over at least a sub-range of the prediction time horizon, and wherein identifying the time period comprises comparing the determined average power demand to at least one power demand threshold.

9. The method according to claim 1, wherein the time threshold is a predetermined fixed value, or wherein the method further comprises determining the time threshold based on at least one of an expected fuel cell degradation resulting from shutdown and start-up of the fuel cell unit, an expected efficiency loss of the power assembly during the time period, and an expected fuel saving during the time period.

10. The method according to claim 1, wherein the power assembly comprises two or more fuel cell units, and wherein identifying the time period comprises identifying a time period during which the power assembly is expected to be able to deliver power in accordance with the power demand with at least one of the at least two fuel cell units shut down, and wherein, in response to the identified time period being larger than the time threshold, said at least one fuel cell unit is scheduled to be shut down during at least a part of the identified time period.

11. The method according to claim 10, wherein the time threshold is set to a value which is specific for each one of the two or more fuel cell units.

12. The method according to claim 1, wherein the power assembly is adapted to deliver power contributing to the propulsion of a vehicle, and wherein predicting the power demand comprises:

receiving vehicle related information comprising at least one of traffic information for an expected travelling route of the vehicle during the prediction time horizon, terrain information for the expected travelling route, topographic information for the expected travelling route during the prediction time horizon, weather information for the expected travelling route during the prediction time horizon, and vehicle gross weight information, and using said received vehicle related information for predicting the power demand over the prediction time horizon.

13. A control unit for controlling a power assembly, the control unit being configured to perform the method according to claim 1.

14. A power assembly comprising one or more fuel cell units and an electric energy storage system for storing excess electric energy produced by the one or more fuel cell units, the power assembly further comprising the control unit according to claim 13.

15. A vehicle comprising a power assembly according to claim 14, wherein the power assembly is adapted to deliver power contributing to the propulsion of the vehicle.

16. A non-transitory computer readable medium carrying a computer program comprising program code for performing the method of claim 1 when the program code is run on a computer.

17. The method according to claim 1, wherein, when the identified time period is shorter than the time threshold, the fuel cell unit remains turned on.

* * * * *